United States Patent

Ganrude et al.

(10) Patent No.: US 10,288,491 B2
(45) Date of Patent: May 14, 2019

(54) THERMOMETER HAVING A PIVOTABLE PROBE

(71) Applicant: Taylor Precision Products, Inc., Oak Brook, IL (US)

(72) Inventors: Jared Ganrude, Hoffman Estates, IL (US); Corinne Sayers, Naperville, IL (US); Jeffrey D. Koon, Naperville, IL (US)

(73) Assignee: Lifetime Brands, Inc., Garden City, NY (US)

( * ) Notice: Subject to any disclaimer, the term of this patent is extended or adjusted under 35 U.S.C. 154(b) by 154 days.

(21) Appl. No.: 15/449,008

(22) Filed: Mar. 3, 2017

(65) Prior Publication Data

US 2017/0254706 A1 Sep. 7, 2017

Related U.S. Application Data

(60) Provisional application No. 62/303,712, filed on Mar. 4, 2016.

(51) Int. Cl.
*G01K 1/08* (2006.01)
(52) U.S. Cl.
CPC ........... *G01K 1/08* (2013.01); *G01K 2207/06* (2013.01)
(58) Field of Classification Search
CPC ..................... G01K 2207/06; G01K 1/146
See application file for complete search history.

(56) References Cited

U.S. PATENT DOCUMENTS

| D182,088 S | 2/1958 | Stiens |
| 5,018,875 A | 5/1991 | Cook |
| 6,267,018 B1* | 7/2001 | Derr ................ G01F 1/684 |
| | | 374/E1.009 |
| 6,501,384 B2 | 12/2002 | Chapman et al. |
| D545,223 S | 6/2007 | Chen |
| 7,520,668 B2 | 4/2009 | Chen |

(Continued)

OTHER PUBLICATIONS

Taylor Precision Products Pro Adjustable Head Digital Thermometer, archive.org Dec. 2015 Amazon.com product listing and listing photographs attached showing public availability.*

(Continued)

*Primary Examiner* — Clayton E. LaBalle
*Assistant Examiner* — Leon W Rhodes, Jr.
(74) *Attorney, Agent, or Firm* — Tutunjian & Bitetto, P.C.

(57) ABSTRACT

A thermometer for detecting and displaying a temperature of food (or the like) is provided. The thermometer has a housing with an upper surface having a temperature display region thereon. The housing has an opposing lower surface. A probe has one end that extends from the lower surface. The probe is pivotal relative to the lower surface. The lower surface defines a rotational member housing and a corresponding rotational member disposed in the rotational member housing. The rotational member housing is configured to rotate within its housing. The probe, or an associated boss or connecting member, extends from the rotational member. Therefore, rotational movement of the rotational member causes the probe to pivot relative to the housing. The probe can pivot between a first position in which the probe is generally parallel with a length of the housing, and a second position generally perpendicular to the housing.

13 Claims, 7 Drawing Sheets

(56) References Cited

U.S. PATENT DOCUMENTS

| | | |
|---|---|---|
| 7,883,267 B2 | 2/2011 | Perry et al. |
| 2001/0040911 A1* | 11/2001 | Rubenstein ............. G01K 1/14 374/141 |
| 2005/0226307 A1 | 10/2005 | Lussier et al. |

OTHER PUBLICATIONS

Homedics LED Digital Thermometer Model No. KT-102, Jul. 25, 2015 archive.org 13deals.com listing showing public sale.*

* cited by examiner

THERMOMETER HAVING A PIVOTABLE PROBE

CROSS-REFERENCE TO RELATED APPLICATIONS

This application claims the benefit of U.S. provisional application Ser. No. 62/303,712 filed Mar. 4, 2016, the disclosure of which is hereby incorporated in its entirety by reference herein.

TECHNICAL FIELD

The present disclosure relates to a thermometer having a housing and a pivotable probe configured to pivot with respect to the housing.

BACKGROUND

Food thermometers are known in the art. Many of these thermometers include an elongated probe for insertion into meat and a housing including a display for displaying a temperature calculated based on the amount of heat sensed by the probe. Many food thermometers have a probe fixed relative to the housing. When these thermometers are placed in food items at certain angles or locations, the user is unable to read the display.

SUMMARY

In one embodiment, a thermometer includes a main housing that has a length extending along a first axis. The main housing includes a temperature display on an upper surface thereof. An opposing lower surface of the main housing includes a pivot member housing at a central region of the lower surface. The pivot member housing contains a pivot member which is capable of rotating within the pivot member housing and pivoting with respect to the main housing. A probe extends from the pivot member, such that the probe is capable of pivoting with respect to the main housing between a first position in which the probe is generally parallel with the first axis, and a second position in which the probe is generally perpendicular with the first axis. A sleeve is configured to fit over and protect the probe. The lower surface of the main housing defines a recess extending along the first axis that is sized to receive the sleeve when the probe is oriented in the first position.

In another embodiment, a thermometer includes a housing having a length, a width, an upper surface defining a temperature display region, and an opposing lower surface defining a rotational member housing. A rotational member is configured to rotate within the rotational member housing. A temperature probe is fixed relative to the rotational member such that rotation of the rotational member causes pivoting of the probe relative to the lower surface. The temperature probe is configured to pivot relative to the lower surface between a first position in which the probe extends along the length of the housing and a second position in which the probe extends away from the housing and generally perpendicular with the length of the housing.

In another embodiment, a food thermometer housing having a length and width is provided. The food thermometer housing has an upper surface defining a temperature display region and an opposing lower surface having a rotational member housing extending from a central region of the lower surface. The rotational member housing defines an edge surface defining a central void for allowing pivoting of a temperature probe therein. The lower surface defines a first recess extending from the central region along the length, and a second recess extending from the first recess along the length and to an end of the lower surface. The second recess is wider than the first recess.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
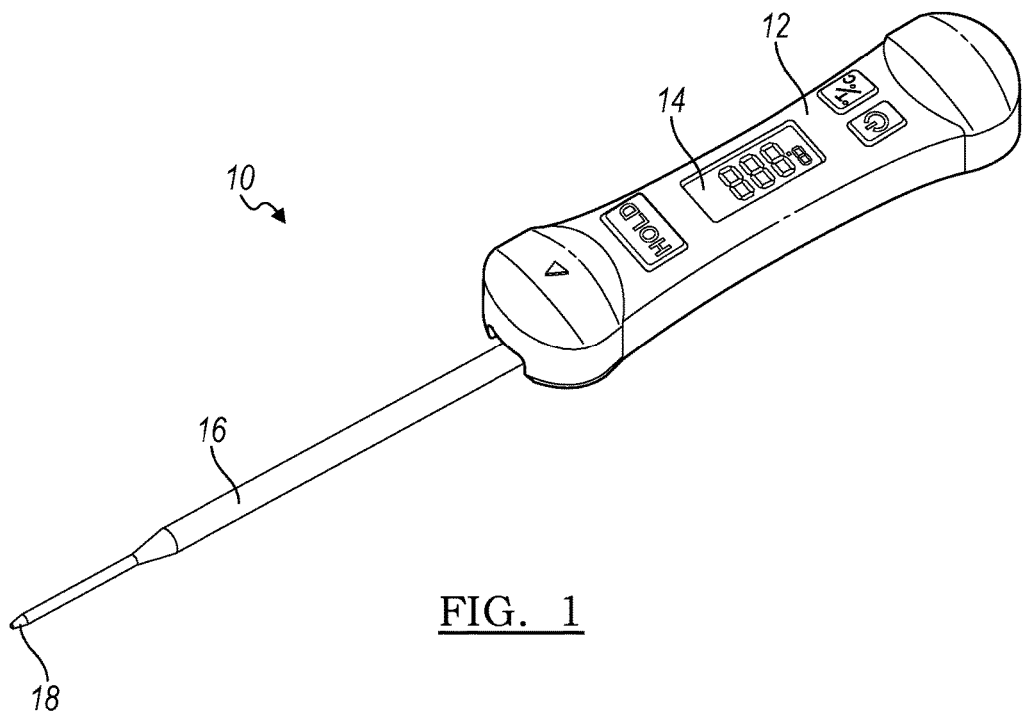
FIG. 1 illustrates a top perspective view of a thermometer having a temperature display housing and a probe positioned in a first position in which the probe is oriented generally parallel to the housing, according to one embodiment.

Referring to FIG. 1, a perspective view is provided that illustrates a thermometer 10 configured to measure the temperature of food (e.g., beef, poultry, fish), for example. The thermometer 10 has a housing 12 that contains hardware that includes one or more microprocessors configured to output a digital temperature reading on a digital display 14. The digital display 14 and the hardware within the housing 12 are coupled to a probe 16. The probe 16 is a thermometer probe that is configured to be inserted into food so that a temperature sensor 18 at the end of the probe 16 can sense the temperature of the food. As will be described below, the probe 16 is pivotable with respect to the housing 12.

Figure 2:
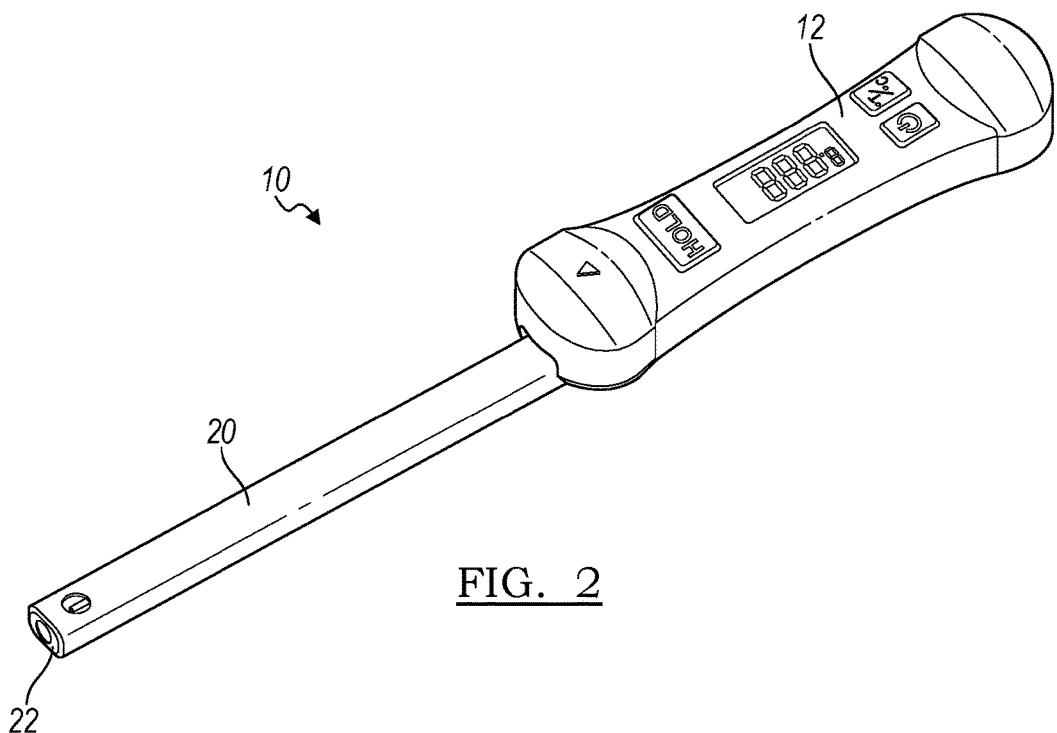
FIG. 2 illustrates a top perspective view of the thermometer of FIG. 1 with a sleeve attached to the probe, according to one embodiment.

FIG. 2 illustrates the thermometer 10 with a sleeve 20 attached thereto. The sleeve 20 has an interior surface (not shown) that is sized to receive the probe 16. The sleeve 20 protects the probe 16 when the probe is not in use. For example, the sleeve 20 may have a closed end 22 that covers the temperature sensor 18 for protection from moisture, impact, and other external and environmental conditions.

Figure 3A:
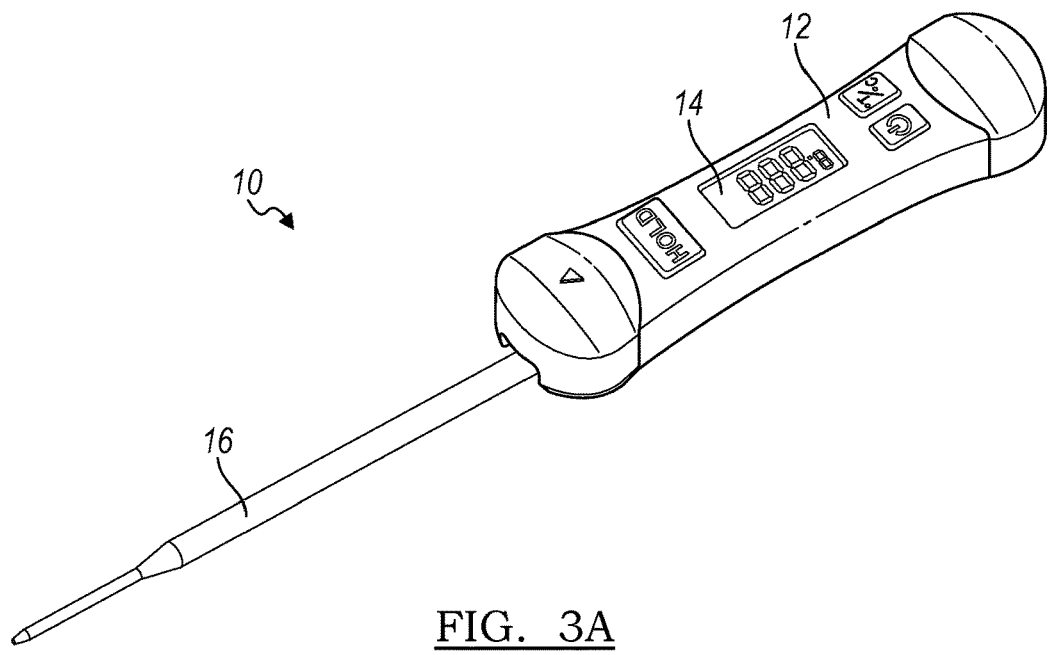
FIG. 3A illustrates another perspective view of the thermometer of FIG. 1 with the probe in the first position.
Figure 3B:
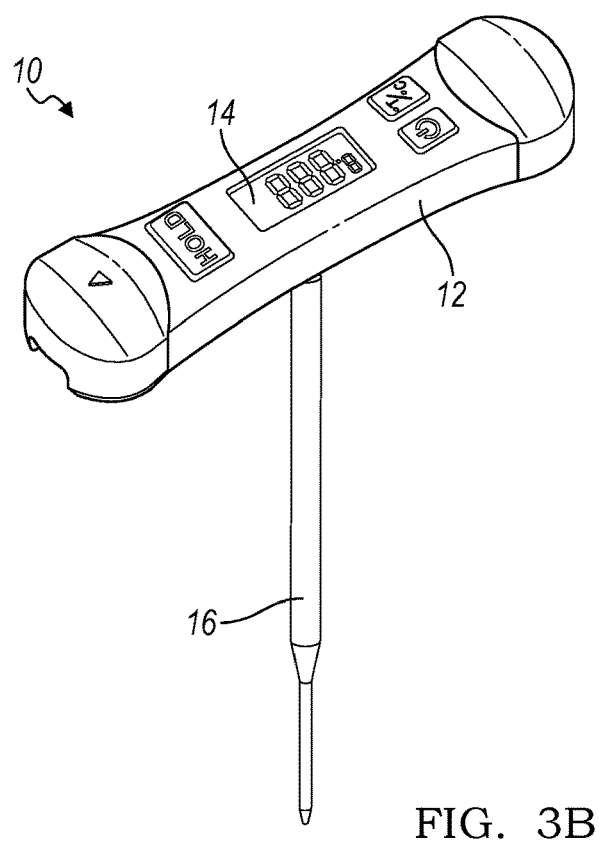
FIG. 3B shows the probe positioned in a second position in which the probe is pivoted to be generally perpendicular to the housing, according to one embodiment.

FIGS. 3A and 3B illustrate the rotation of the probe 16 with respect to the housing 12. In FIG. 3A, the thermometer 10 is oriented in a first position in which the temperature probe 16 extends generally parallel with a length of the housing 12. In this position, the thermometer 10 is configured to display temperature readings when the thermometer 10 is inserted sideways into a side of the food item. For example, the first position is beneficial for measuring the temperature of a filet in which the tip of the probe 16 is inserted sideways into the side of the filet through the meat while the digital display 14 faces the user. This eliminates the need for the user to bend over and look sideways at the end of the filet in order to get a temperature reading. Instead, the digital display faces upward while the probe extends horizontally and linearly into the filet, allowing the user to obtain a temperature reading while looking at the top of the filet.

In FIG. 3B, the thermometer is oriented in a second position in which the temperature probe 16 extends generally perpendicular to the length of the housing 12. In this position, the thermometer 10 is configured to display the temperature readings in which the thermometer 10 is inserted downward into the food item. For example, the second position is beneficial for measuring the temperature of a roast in which the tip of the probe 16 is inserted into the top of the roast and downward through the meat while the digital display 14 faces the user.

Figure 4A:
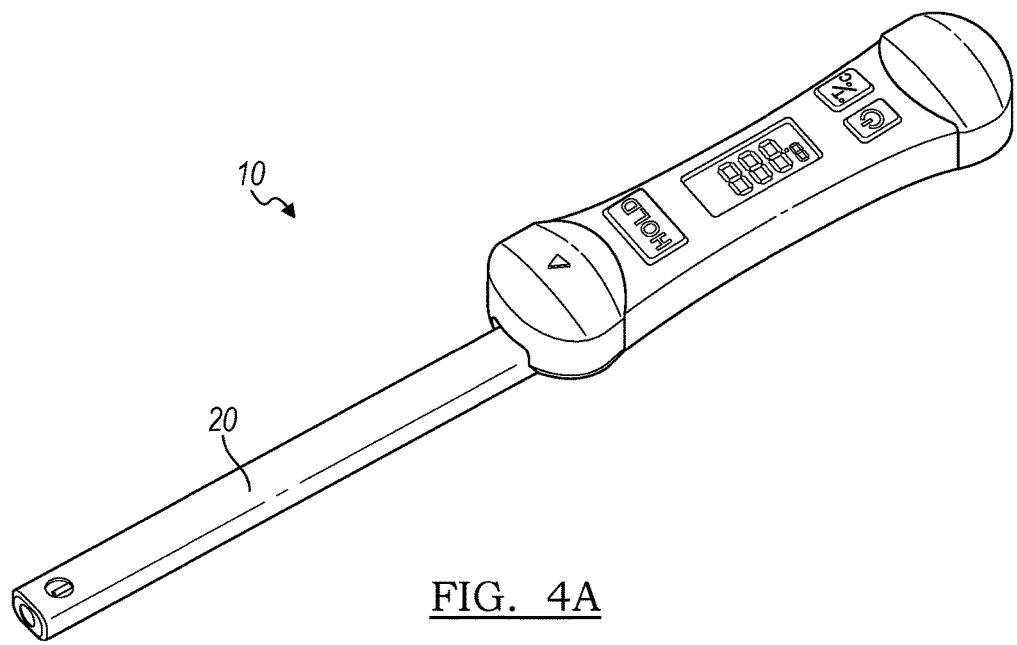
FIG. 4A illustrates another perspective view of the thermometer with the probe and attached sleeve in the first position.
Figure 4B:
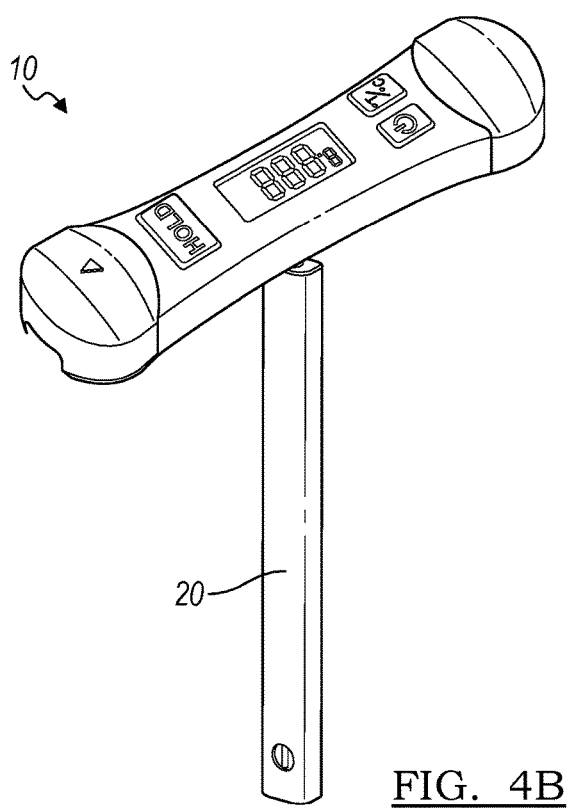
FIG. 4B shows the thermometer with the probe and attached sleeve in the second position, according to one embodiment.

FIGS. 4A and 4B illustrate the thermometer 10 in the first and second positions, with the sleeve 20 attached about the probe 16. Additional detail regarding the sleeve 20 is provided below. The probe 16 is configured to pivot at any orientation between the first and second positions, e.g., 20, 40, 60 and 80 degrees, and lock into place relative to the housing 12 at any of these positions. In one embodiment, the locking into place may be accomplished by a strong resistance force provided against the probe which holds the probe in any position between 0 and 90 degrees of rotation.

Figure 5A:
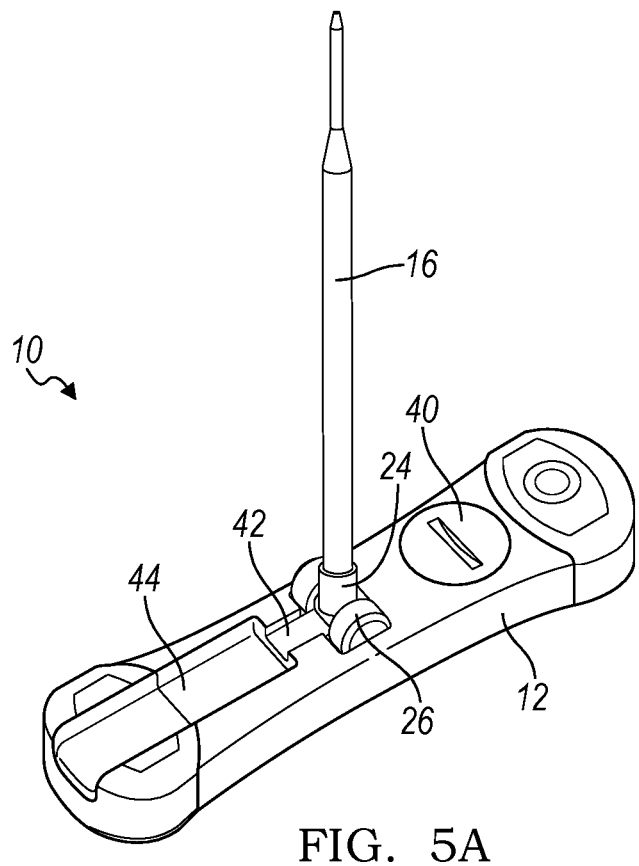
FIG. 5A illustrates a bottom perspective view of the thermometer with the probe in the second position.
Figure 5B:
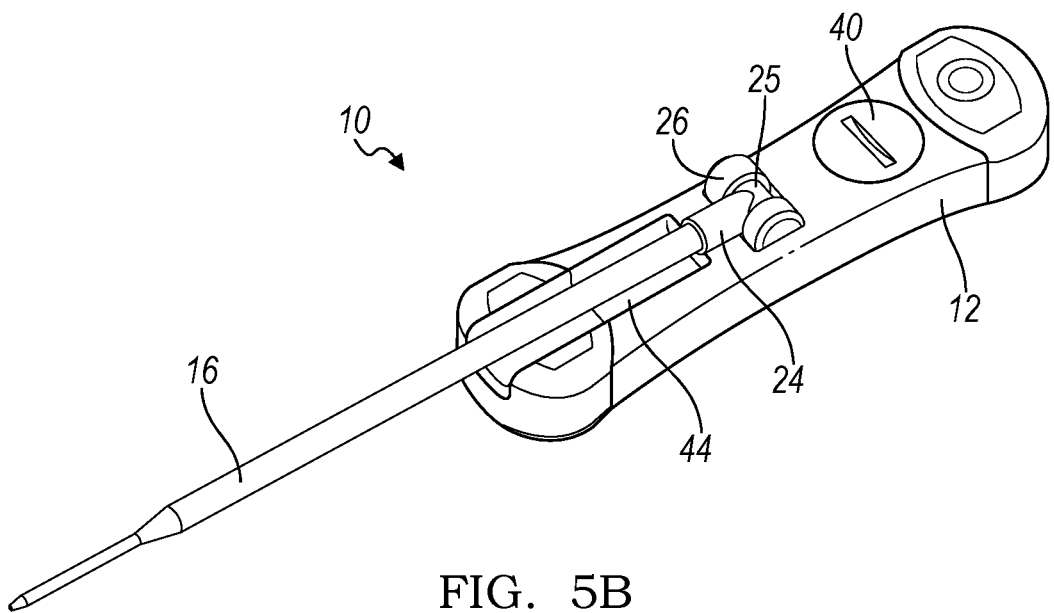
FIG. 5B illustrates a bottom perspective view of the thermometer with the probe in the first position, according to one embodiment.
Figure 6A:
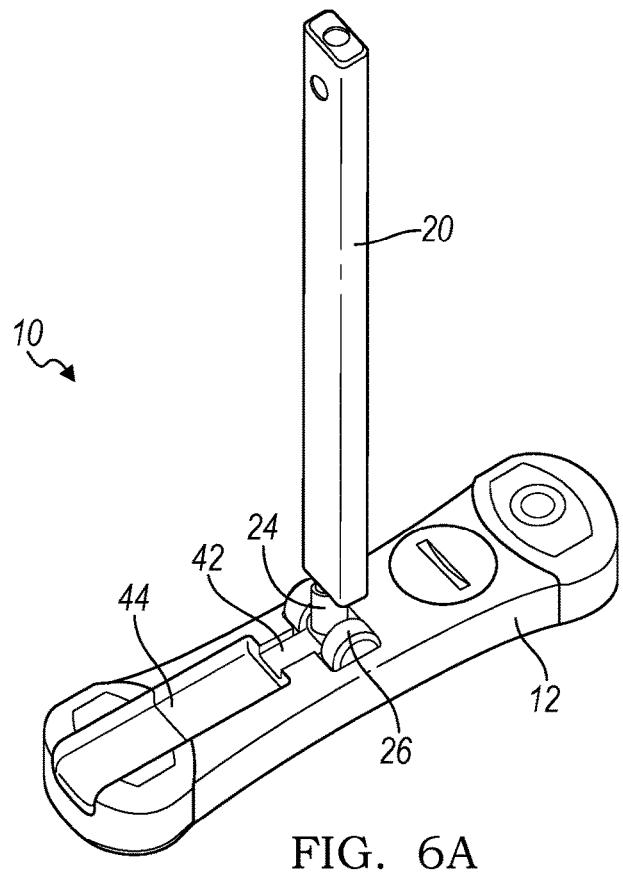
FIG. 6A illustrates a bottom perspective view of the thermometer with the probe and attached sleeve in the second position.
Figure 6B:
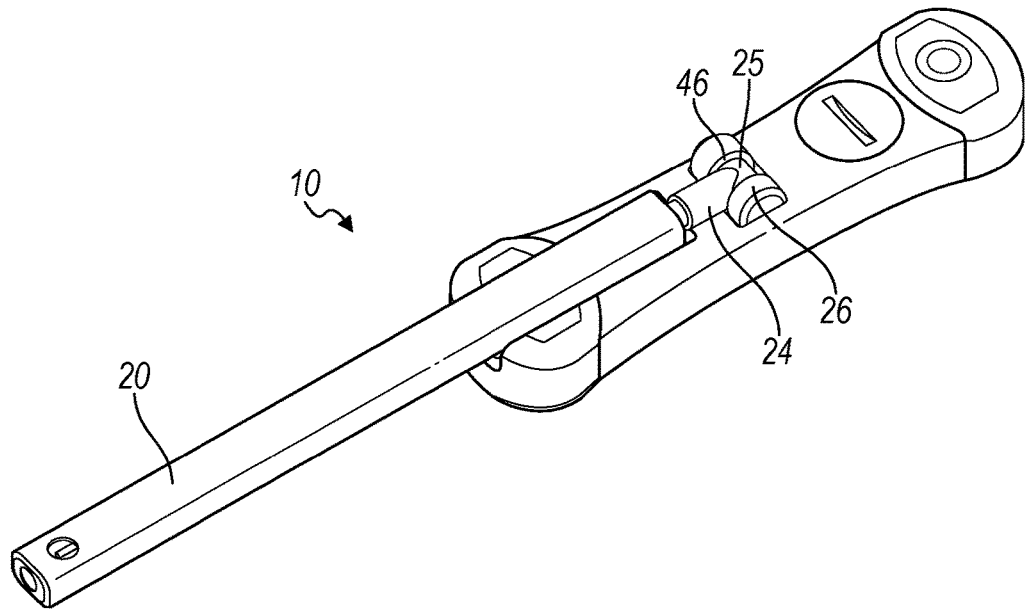
FIG. 6B illustrates a bottom perspective view of the thermometer with the probe and attached sleeve in the first position, according to one embodiment.

FIGS. 5A-5B illustrate the bottom side of the housing 12 to which the probe 16 is pivotally coupled. FIGS. 6A-6B illustrate the same view, except with the sleeve 20 attached to the thermometer about the probe 16. The bottom side of the housing 12 can include a battery access panel 40 to provide access to a battery that powers the digital display 14. The probe 16 is pivotally attached to the bottom side of the housing 12. The probe 16 is fixedly connected to and extends from a boss 24, which as a diameter that exceeds the diameter of the probe 16. The boss 24 extends from a pivot member 25 (also referred to as a rotational member) having a length and axis of rotation that is transverse to the length of the probe 16. The pivot member 25 is rotatably housed within the pivot member housing 26, which is fixed to or formed into the bottom side of the housing 12 in a central region of the bottom side of the housing. The pivot member 25 is generally cylindrical and is pivotable with respect to the housing 12 about a central axis of the pivot member 25. Rotating of the pivot member 25 about its central axis within the pivot member housing 26 enables pivoting of the attached probe 16 with respect to the housing 12.

First and second recesses 42, 44 are formed in the bottom side of the housing 12. The first recess 42 is generally cylindrical (or semi-cylindrical) in shape such that it is configured to receive the boss 24 when the probe 16 is pivoted into the first position (shown in FIG. 8B). The housing 12 can be made of plastic which enables the first recess 42 to be able to resiliently deform when the boss 24 is pressed into the recess 42, thereby securing the boss 24 within the first recess 42. The second recess 44 is slightly larger in width and length than the first recess 42, and is also wider than the diameter of the probe 16. The second recess 44 is sized and configured to receive the sleeve 20 when the probe 16 and sleeve 20 are in the first position. The second recess 44 can also resiliently deform to secure the sleeve 20 to the housing 12 when in the first position.

Referring to FIG. 6B, the pivot member housing 26 has an opening or other void of material to allow the boss 24 to pivot with respect to the pivot member housing 26. The opening in the pivot member housing 26 is defined by an edge surface 46. The edge surface 46 may be positioned such that it touches the boss 24 when the probe 16 is oriented in the second position. The edge surface 46 acts as a stopper in this manner, as it prevents further rotation of the probe 16. Thus, the probe 16 can be confined to pivot only 90 degrees between the first and second positions.

Figure 7A:
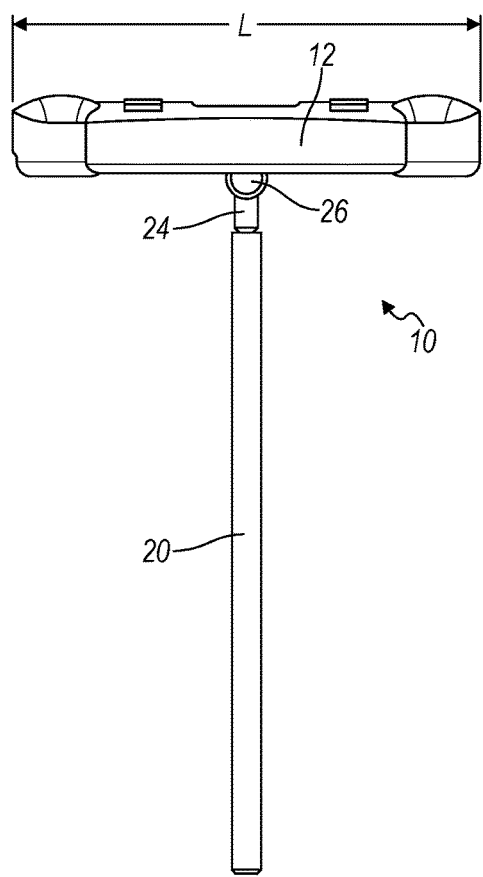
FIGS. 7A and 7B illustrate a side view and an end view, respectively, of the thermometer with the probe and attached sleeve in the second position, according to one embodiment.
Figure 7B:
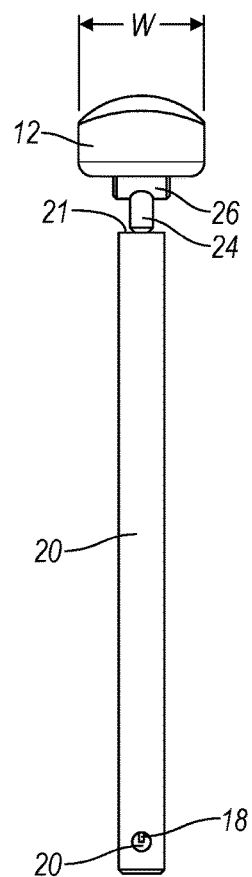
Figure 8:
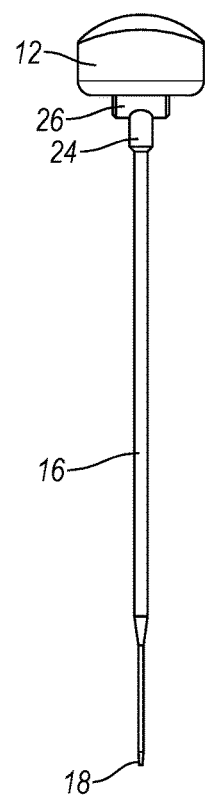
FIG. 8 illustrates an end view of the thermometer with the probe in the second position, similar to FIG. 7B, except without the sleeve attached, according to one embodiment.

Referring to FIGS. 7A, 7B, and 8, the thermometer 10 is shown in the second position with the probe 16 and attached sleeve 20 extending generally perpendicular to the length "L" of the housing 12. The length "L" of the housing is longer than a width "W" of the housing. The sleeve 20 has an open end 21 defining an opening (not shown) that is sized to receive the probe 16. The open end 21 of the sleeve 20 can be pressed up toward the housing 12 until the sleeve reaches the boss 24, which has a diameter that exceeds the diameter of the opening in the open end 21. The size of the boss 24 with respect to the opening of the open end 21 prevents further movement of the sleeve 20 toward the housing 12. A snap fit can be provided when the sleeve 20 reaches the boss 24. The boss 24 is connected to a cylindrical pivot member 25 (not shown) which is housed within a pivot member housing 26. The pivot member 25 may be rotatably housed within the pivot member housing 26 which is fixedly connected to the underside of the housing 12. This enables the attached probe 16 to pivot between the first and second positions with respect to the housing 12.

The sleeve 20 can also have an aperture 28 extending entirely therethrough. The aperture 28 is aligned with the temperature sensor 18 at the tip of the probe 16 when the sleeve 20 is pressed into position to cover the probe 16.

Figure 9A:
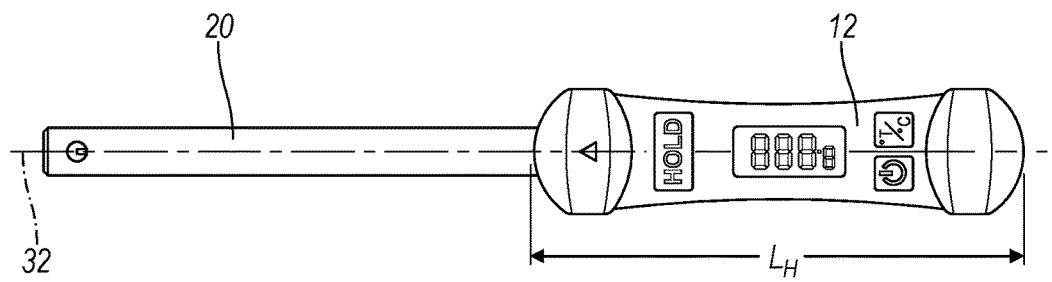
FIGS. 9A, 9B, and 9C illustrate a top view, a bottom view, and a side view, respectively, of the thermometer with the probe and attached sleeve in the first position, according to one embodiment.
Figure 9B:
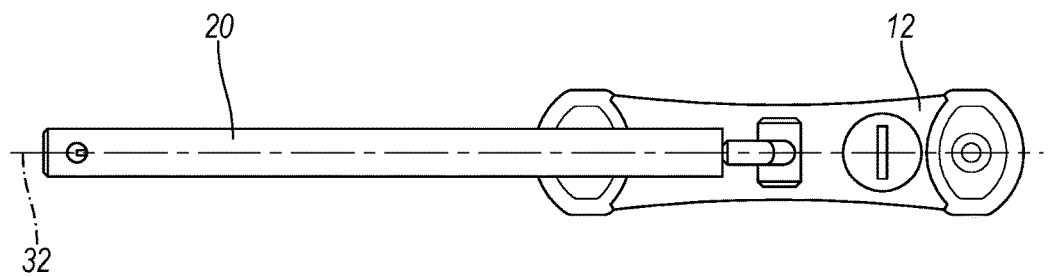
Figure 9C:
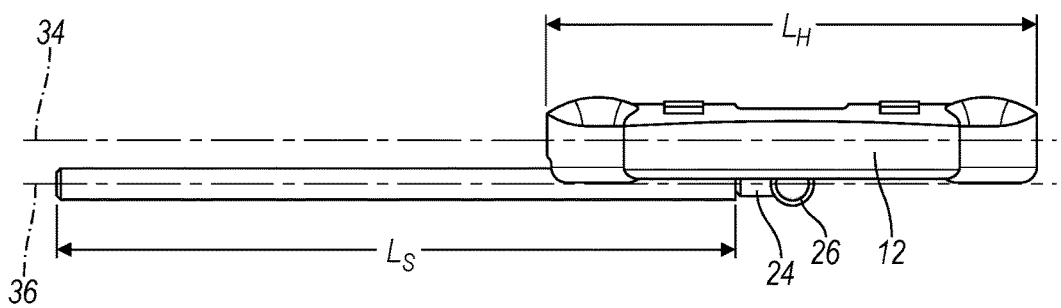

FIGS. 9A-9C illustrate the relative location and position of the probe and attached sleeve 20 when oriented in the first position. The housing 12 has a housing length "$L_H$" that extends in a direction along an axis 32. The sleeve 20 has a sleeve length "$L_S$" that, when oriented in the first position and attached to the probe, extends in a direction along the axis 32. As shown in FIG. 7C, the housing length $L_H$ extends in a direction along axis 34, and the sleeve length $L_S$ extends in a direction along axis 36 which is parallel to axis 34. The probe and sleeve 20 extend generally parallel with the length of the housing 12 when in this orientation. Since the digital display 14 is read from left-to-right along the length of the housing 12, this provides an orientation that allows the probe 16 to be inserted into the end of the meat with the digital display facing the user in an orientation that allows for easy left-to-right reading of the temperature. In other words, the direction of reading of the temperature is aligned with the direction of the probe when in the first position. When the probe 16 and sleeve 20 are pivoted with respect to the housing 12 to be oriented in the second position, axis 36 can become perpendicular with axis 34.

It should be understood that the terms "perpendicular" and "parallel" as used herein are terms of general relative alignment and are not intended to be necessarily limited to exactly perpendicular or exactly parallel. These terms are intended to include orientation that is not exactly perpendicular or parallel, but within some tolerance that an ordinary observer would understand as being "generally perpendicular" or "generally parallel." In one example, "generally perpendicular" and "generally parallel" can include a 10-degree tolerance from being exactly perpendicular or example parallel.

Furthermore, the words "sideways," "top," "bottom" and "end" as used herein designate direction in the figures to which reference is made. These and other directional terminologies are used in the description for convenience only and refer to the orientation shown in the figures. The terms are not intended to be limited.

The words "pivot" as used herein with respect to the probe is not intended mean that the end of the probe is absolutely fixed while the remainder of the probe rotates about the fixed end. There may be some give or slight movement at the end of the probe that is connected to the housing. Also, the pivot point of any pivoting action need not be at the absolute end of the probe. Rather, the pivot point may be slightly offset from the absolute end of the probe such that regions of the probe on either side of the pivot point rotate about the pivot point as the probe pivots.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A thermometer for obtaining a temperature of food, the thermometer comprising:
    a main housing having a length extending along a first axis, an upper surface defining a temperature display region, and a lower surface opposite the upper surface, the lower surface defining a rotational member housing and a first recess extending along the first axis;
    a rotational member disposed in the rotational member housing, the rotational member capable of rotating within the rotational member housing and relative to the main housing;
    a probe extending from the rotational member, wherein the probe is configured to pivot relative to the main housing between a first position in which the probe is generally parallel with the first axis and a second position in which the probe is generally perpendicular with the first axis; and
    a sleeve configured to slide over and surround at least a portion of the probe, the first recess receiving the sleeve when the probe is oriented in the first position.

2. The thermometer of claim 1, wherein the first recess defines a lower surface that engages the sleeve when the probe is oriented in the first position.

3. The thermometer of claim 1, wherein the lower surface of the main housing defines a second recess that is narrower than the first recess.

4. The thermometer of claim 3, wherein the second recess is located along the first axis between the first recess and the rotational member housing.

5. The thermometer of claim 1, further comprising a boss extending from the rotational member and connecting the rotational member and the probe.

6. The thermometer of claim 1, wherein the rotational member housing has an edge surface that engages the boss when the probe is oriented in the second position.

7. A thermometer comprising:
    a housing having a length, a width, an upper surface defining a temperature display region, and an opposing lower surface defining a rotational member housing;
    a rotational member configured to rotate within the rotational member housing;
    a temperature probe fixed relative to the rotational member such that rotation of the rotational member causes pivoting of the probe relative to the lower surface, wherein the temperature probe is configured to pivot relative to the lower surface between a first position in which the probe extends along the length of the housing and a second position in which the probe extends away from the housing and generally perpendicular with the length of the housing;
    a boss extending between and connecting the rotational member and the temperature probe; and
    a sleeve having an opening defined within a surface, wherein the sleeve is configured to slide over the temperature probe until the boss engages the surface to inhibit further sliding of the sleeve.

8. The thermometer of claim 7, wherein the temperature probe extends directly from the rotational member.

9. The thermometer of claim 7, wherein the lower surface defines a recess sized to receive the boss in a fitting engagement when the temperature probe is in the first position.

10. The thermometer of claim 7, wherein the lower surface defines a second recess sized to receive the sleeve in a fitting engagement when the temperature probe is in the first position.

11. The thermometer of claim 7, wherein the lower surface defines a first recess extending along the length from the rotational member housing, and a second recess extending along the length from the first recess to an end of the housing.

12. The thermometer of claim 11, wherein the second recess is wider than the first recess.

13. A food thermometer housing having a length and a width, the food thermometer housing comprising:
  an upper surface defining a temperature display region; and
  an opposing lower surface having a rotational member housing extending from a central region of the lower surface, the rotational member housing defining an edge surface defining a central void for allowing pivoting of a temperature probe therein, the lower surface defining a first recess extending from the central region along the length and sized to receive a boss of a temperature probe in a fitting engagement, the lower surface defining a second recess extending from the first recess along the length and to an end of the lower surface, wherein the second recess is wider than the first recess and sized to receive a sleeve placed over the temperature probe in a fitting engagement.

* * * * *